United States Patent [19]
Sievers et al.

[11] Patent Number: 5,952,605
[45] Date of Patent: Sep. 14, 1999

[54] GRADED POROSITY ARTERY FOR ALKALI METAL THERMAL TO ELECTRIC CONVERSION (AMTEC) CELLS

[75] Inventors: Robert K. Sievers, Ann Arbor; Robert Carl Svedberg, Pinckney; Thomas Kintzing Hunt, Ann Arbor; Terry J. Hendricks, Saline, all of Mich.

[73] Assignee: Advanced Modular Power Systems, Inc., Ann Arbor, Mich.

[21] Appl. No.: 08/901,439

[22] Filed: Jul. 28, 1997

[51] Int. Cl.⁶ .................................................. H01L 35/30
[52] U.S. Cl. ......................... 136/205; 136/242; 429/104; 429/112
[58] Field of Search ................................... 136/203, 204, 136/205, 212, 242; 429/102, 104, 112, 120, 17; 62/3.2

[56] References Cited

U.S. PATENT DOCUMENTS

| | | | |
|---|---|---|---|
| 3,931,532 | 1/1976 | Byrd ........................................ | 136/202 |
| 4,098,958 | 7/1978 | Bettman .................................. | 429/17 |
| 4,808,240 | 2/1989 | Sievers ................................... | 136/202 |
| 4,948,679 | 8/1990 | Hunt et al. .............................. | 429/11 |
| 5,039,351 | 8/1991 | Cooper et al. .......................... | 136/202 |
| 5,089,054 | 2/1992 | Sievers ................................... | 136/202 |
| 5,228,922 | 7/1993 | Sievers ................................... | 136/202 |

OTHER PUBLICATIONS

"A Capillary Pumped She/AMTEC System", Ernst, Donald M., Lancaster, PA No Year or Month Available.

"Small Capillary Pumped AMTEC Systems", Hunt, Thomas K., Sievers, Robert K., Butkiewicz, David A., Pantolin, Jan E. and Ivanenok, Joseph F., American Institute of Physics CONF 930103, Advanced Modular Power Systems, Inc., Ann Arbor, MI 1993. No Month Available.

"Designing a Wick for Sodium Recirculaltion of AMTEC Cells", Williams, Roger M., Underwood, Mark L., and Ryan, Margaret A., Document No. 93043, Kotaro Tanaka, Tsukuba, Ibaraki, Japan. No Year or Month Available.

"Advances in Studies of Electrode Kinetics and Mass Transport in AMTEC Cells", Williams, Robert M. Jeffries–Nakamura, B., Ryan, M. A., Underwood, M. L., Kisor, A., O'Connor, D., and Kikkert, S., Jet Propulsion Laboratory, California Institute of Technology, Pasadena, CA, Document No. 93373, © American Chemical Society, 1993. No Month Available.

"Capillary Pumped AMTEC Module Performance", Hunt, T.K., Sievers, R.K., Ivanenok, J.F., Pantolin, J.E., and Butkiewicz, D.A., Advanced Modular Power Systems, Inc. Ann Arbor, MI, Document No. 93307, © American Chemical Socieity, 1993. No Month Available.

(List continued on next page.)

Primary Examiner—Kathryn Gorgos
Assistant Examiner—Thomas H Parsons

[57] ABSTRACT

The present invention provides an alkali metal thermal to electric conversion (AMTEC) cell of the type employing an alkali metal flowing between a high-pressure zone and low-pressure zone in the cell through a solid electrolyte structure. The cell preferably includes a condenser communicating with the low-pressure zone for condensing alkali metal vapor migrating through the low-pressure zone from the solid electrolyte structure. An artery is coupled to the condenser for directing condensed alkali metal from the condenser toward a hot end of the cell. An evaporator for evaporating the condensed alkali metal is coupled to the artery channel and communicates with the high-pressure zone. The artery and evaporator combine to form a return channel which preferably includes a graded pore size capillary structure for creating a region having a large pore size transitioning in any predetermined manner to a region having a relatively smaller pore size. In this way, the capillary pressure provided by the return channel is optimized along its length while minimizing flow restrictions which are presented where the pore sizes are smaller than required to sustain alkali metal flow in portions of the return channel.

11 Claims, 4 Drawing Sheets

OTHER PUBLICATIONS

"Electrode Systems and Heat Transfer in Thermoelectric Generator Design", Sherrit, S., Sayer, M., and Kindl, B., Dept. of Physics, Queen's University, Kingston, Ontario, Canada, and Almax Industries, Ltd., Ontario, Canada, Document No. 889112. No Year or Month Available "Performance of a Wick Return AMTEC Cell With a Micromachined Condenser", Crowley, Christopher J., Izenson, Michael G., Wallis, Peter N., Sievers, Robert K., Ivanenok, Joseph F. III, Creare, Inc. Hanover, NH and Advanced Modular Power Systems, Ann Arbor, MI, Document No. AIAA–94–3832–CP, © American Institute of Aeronautics and Astronautics, Inc., 1994. No Month Given.

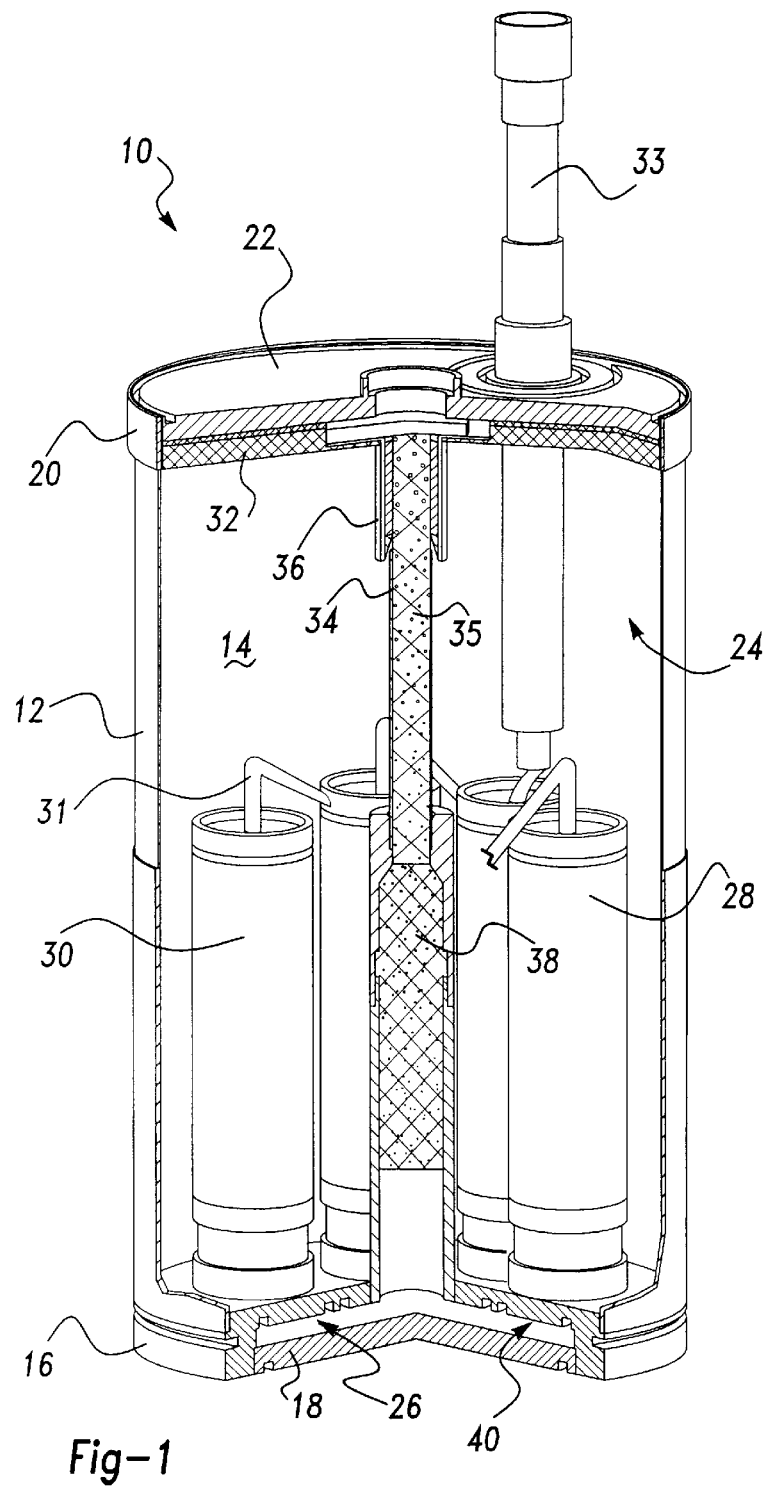
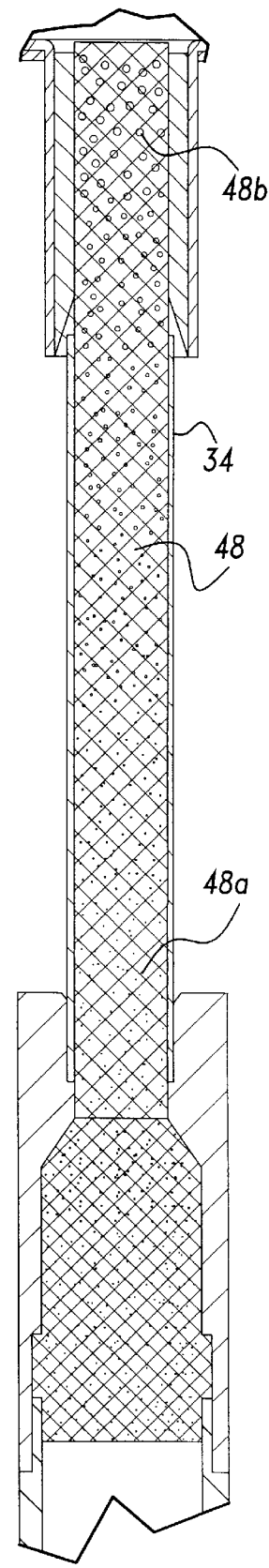
Fig-1
Fig-2

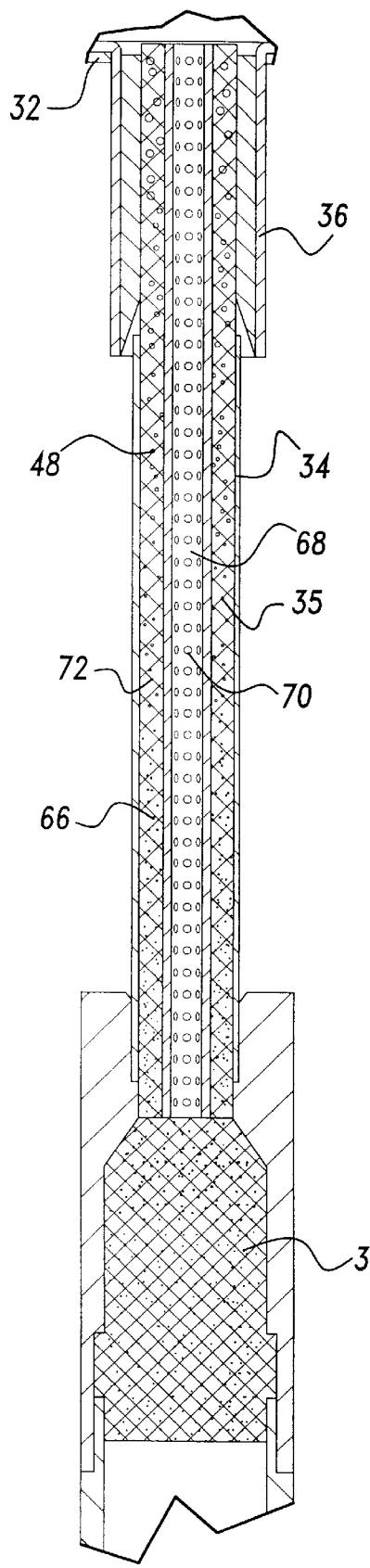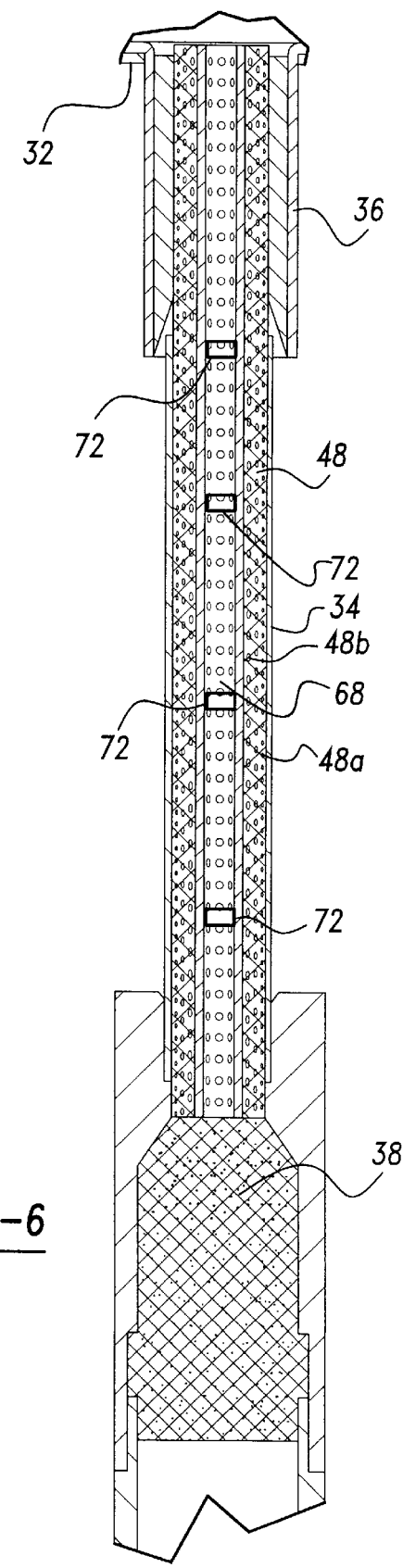
Fig-5
Fig-6

GRADED POROSITY ARTERY FOR ALKALI METAL THERMAL TO ELECTRIC CONVERSION (AMTEC) CELLS

BACKGROUND OF THE INVENTION

1. Technical Field

The present invention generally relates to alkali metal thermal to electric conversion (AMTEC) cells and more particularly to a return channel for such a cell having a graded capillary structure for supporting the flow of condensed alkali metal in the cell which provides enhanced flow characteristics.

2. Discussion

An AMTEC cell is a thermally regenerative concentration cell typically utilizing sodium or potassium as a working fluid and a beta-alumina type solid electrolyte as an ion selective membrane. While throughout this description sodium is referred to as the working fluid, it is to be understood that other alkali metals are applicable to this invention. The electrolyte permits a nearly isothermal expansion of sodium to generate high-current/low voltage power at high efficiency. Most AMTEC cells employ at least one beta-alumina type solid electrolyte (BASE) element which is exposed to high-pressure sodium on one surface and low-pressure sodium on the opposite surface.

The BASE element's opposed surfaces are overlaid with permeable electrodes which are connected to each other through an external load circuit. Neutral sodium atoms incident on the BASE element's high pressure surface give up their electrons at one electrode (the anode). The resulting sodium ions pass through the element wall under the applied pressure differential, and the emerging sodium ions are neutralized at the other electrode (the cathode) by electrons returning from the external load. Thus, the pressure differential drives the sodium through the BASE element thereby creating an electrical current which passes through the external load resistance. One configuration for such an AMTEC cell utilizes BASE elements in the form of hollow cylindrical tubes in which the tube's inner surface supports the anode and the outer surface supports the cathode.

The neutral sodium atom vapor leaving the cathode flows through the space between the BASE elements and the cell wall until it condenses at the low-temperature condenser at one end of the cell. From there, the sodium condensate flows through an artery containing a fine pore wick commonly consisting of a packed metallic felt. The liquid sodium evaporates at the end of an evaporator wick which is coupled to the artery. The high-pressure sodium vapor is returned to the BASE elements through a common plenum at the opposite "hot" end of the cell.

Some cells employ multiple BASE tubes and are operated under conditions such that the sodium is in the vapor phase on both sides of the BASE elements to prevent shorting of the electrodes. In the cell configuration mentioned above, the inner surface of each BASE tube is exposed to high-pressure sodium vapor and the outer surface is exposed to low-pressure sodium vapor. The high-temperature evaporator near the hot end of the cell produces the high pressure and the low-temperature condenser at the cold end of the cell maintains the low-pressure.

In order to operate at high efficiency, the artery and evaporator, hereinafter referred to collectively as "the return channel", must support the recirculation of the alkali metal at a capillary pressure equal to or greater than the vapor pressure of the alkali metal at the hot end. As the alkali metal migrates along the length of the return channel, the vapor pressure changes in relation to the local cell temperature. That is, at lower temperature regions of the cell, the alkali metal vapor pressure is lower than it is at higher temperature regions of the cell.

To support the vapor pressure of the alkali metal, the capillary structure of the return channel creates a capillary pressure capable of sustaining the alkali metal flow. Conventional AMTEC cells employ a metallic felt or screen wick capillary structure with uniformly sized small pores or openings along the entire length of the return channel. This ensures that the capillary pressure at the hot end of the return channel is sufficient to support the flow of the alkali metal. However, the small pores at the cold end of the return channel typically result in a higher flow resistance which unduly restricts the flow of the alkali metal. This causes an undesirable pressure drop within the cell which adversely affects performance and leads to a corresponding low power output.

Accordingly, it is desirable to provide a return channel having a capillary structure for sustaining the flow of the alkali metal over a broad range of alkali metal vapor pressures. To accomplish this, a graded pore size capillary structure may be employed in the return channel having a small pore size, and corresponding high capillary pressure, at the hot end of the artery, and a larger pore size, and corresponding low capillary pressure and low flow resistance at the cold end of the artery. As such, the varying vapor pressure of the alkali metal is sustainable along the entire length of the return channel while minimizing the pressure drop of the working fluid traveling along the capillary structure. It is also desirable to provide a method of forming the graded capillary structure which is quick, reliable, and cost effective.

SUMMARY OF THE INVENTION

The above and other objects are provided by an alkali metal thermal to electric conversion (AMTEC) cell of the type employing an alkali metal flowing between a high-pressure zone and a low-pressure zone in the cell through a solid electrolyte structure. The cell preferably includes a condenser communicating with the low-pressure zone for condensing alkali metal vapor migrating through the low-pressure zone from the solid electrolyte structure. An artery is coupled to the condenser for directing condensed alkali metal from the condenser toward a hot end of the cell. An evaporator for evaporating the condensed alkali metal is coupled to the artery and communicates with the high-pressure zone. The artery and evaporator combine to form a return channel which preferably includes a graded pore size capillary structure having a small pore size region gradually transitioning to a larger pore size region resulting in a range of capillary pressures within the return channel corresponding to the changing alkali metal vapor pressure within the artery structure.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a perspective view in partial cross-section of an AMTEC cell having a return channel incorporating the teachings of the present invention;

FIG. 2 is a more detailed view in cross-section of the return channel including a graded pore size capillary structure;

FIG. 5 is a cross-sectional view of a two-stage permeability return channel;

FIG. 6 is a cross-sectional view of a two-stage permeability return channel having a radially graded pore size capillary structure.

DETAILED DESCRIPTION OF THE PREFERRED EMBODIMENTS

Figure 3:
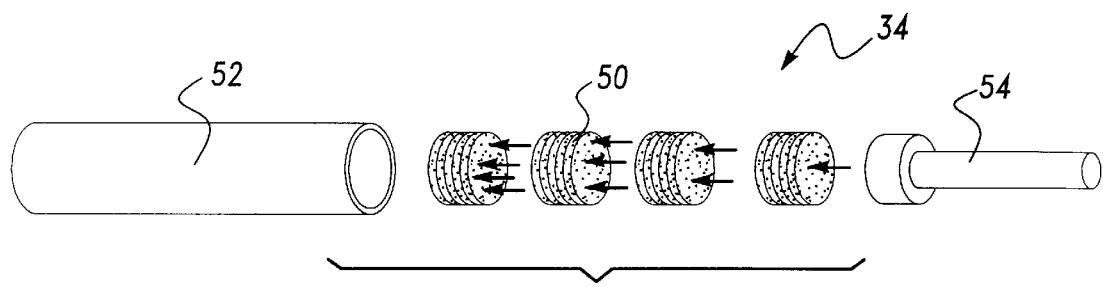
FIG. 3 is a schematic view of a method of forming the graded pore size capillary structure of the present invention.

The present invention is directed towards a return channel with a graded pore size capillary structure extending between the condenser and evaporator in an alkali metal thermal to electric conversion (AMTEC) cell. As the alkali metal travels along the return channel from a cold cell region adjacent the condenser to a hot cell region proximate the evaporator, the changing alkali metal vapor pressure is sustained by increasing capillary pressure generated by the graded pore size capillary structure. As such, the flow of the alkali metal flows with minimal restriction through regions of relatively low alkali metal vapor pressure and regions of relatively high alkali metal vapor pressure. Thus, the vapor pressure is maintained within the return channel and the output performance of the AMTEC cell is optimized.

Turning now to the figures, an AMTEC cell incorporating the teachings of the present invention is illustrated in FIG. 1 and indicated generally at 10. The AMTEC cell 10 generally includes a cell wall 12 defining a chamber 14 which is closed at a first end 16 by a first end cap 18. The first end 16 is generally known in the art as the hot end of the cell 10. The chamber 14 is also closed at a second end 20 by a second end cap 22. The second end 20 is generally known in the art as the cold end of the cell 10. The chamber 14 is separated into a low-pressure zone 24 and a high pressure zone 26 by a solid electrolyte structure 28. In the illustrated embodiment, the solid electrolyte structure 28 includes a plurality of beta-alumina type solid electrolyte (BASE) tubes 30 electrically connected in series by leads 31. The leads 31 are coupled to a terminal 33 projecting exterior of the cell 10. Although the BASE tubes 30 are shown, it is to be understood that the present invention is also suitable for use in conjunction with solid electrolyte structures of other configurations.

A condenser 32 is disposed in, and therefore communicates with, the low-pressure zone 24. As can be seen, the condenser 32 is coupled to the cell wall 12 about its periphery adjacent the second end cap 22. An artery 35, preferably packed with metallic felt to be described in greater detail below, is coupled to the condenser 32 by a mounting member 36. The artery 35 extends from the condenser 32 through the low-pressure zone 24 towards the hot end 16 of the cell 10.

The artery 35 is connected to an evaporator 38 which communicates with the high-pressure zone 26. A common plenum 40 adjacent the hot end 16 of the cell 10 interconnects the evaporator 38 and the high-pressure side of the solid electrolyte structure 28. An alkali metal working fluid, such as sodium, is disposed within the cell 10. For convenience, the artery 35 and evaporator 38 will be referred to hereinafter collectively as the return channel 34.

In operation, neutral sodium atoms incident on the high pressure side of the electrolyte structure 28 release their electrons to an inner electrode. The resulting sodium ions pass through the solid electrolyte structure 28 under an applied pressure gradient and the emerging sodium ions are neutralized at an outer electrode by electrons returning from the external load. The neutral sodium atom vapor leaving the outer electrode migrates through the low-pressure zone 24 and condenses at the condenser 32. The sodium condensate flows through the artery 35 to the evaporator 38. The liquid sodium evaporates at the evaporator 38 and the high-pressure sodium vapor is returned to the high-pressure side of the solid electrolyte structure 28 through the plenum 40.

Turning now to FIG. 2, the return channel 34 is shown in greater detail. As can be seen, the return channel 34 includes a graded pore size capillary structure 48. The graded pore size structure 48 includes small-sized pores 48a yielding a corresponding high capillary pressure and lower permeability in the higher temperature regions of the return channel 34 near the hot end 16 of the cell 10. The small-sized pores transition to larger-sized pores 48b yielding corresponding lower capillary pressure and higher permeability in the lower temperature regions of the cell 10 at the opposite end of the return channel 34. The graded pore size structure 48 enables the return channel 34 to provide an optimal capillary pressure along the entire length of the return channel without unnecessary flow restrictions. It should be noted that although both the artery 35 and evaporator 38 are illustrated with the graded pore size structure, an artery with a graded pore size structure may also be used with a conventional evaporator. Likewise, an evaporator with a graded pore size structure may be utilized with a conventional artery. In certain instances it may be desirable to vary the pore size gradient such that the pore sizes vary from large to small and back to large, or even from small to large among others. The skilled practitioner will recognize that the gradient of the pore sizes may be selected on a case by case basis to yield the desired permeability, flow conductance and/or capillary pressure along the length of the return channel. Also, the term "pores" as used herein is meant to encompass any "openings" or radii of curvature of features with a definable characteristic dimension within the membrane of the return channel.

Referring now to FIG. 3, a method of forming the return channel 34 is illustrated. The graded pore size structure in the return channel 34 is preferably formed by cutting and pressing small felt discs 50 into a return channel tube 52. Each disc 50 is pressed by a mandrel 54 to a specified force or displacement within the tube 52. This force reduces the individual pore size in each disc 50 to a pre-selected size. The pre-selected pore size is determined so as to produce the capillary forces equal to, or greater than, the vapor pressure of the alkali metal typically found at the disc's location within the tube 52 when it is assembled in the cell 10 as the return channel 34. The vapor pressure of the alkali metal at different locations within the return channel 34 may be determined according to the known temperature gradient within the cell 10.

Figure 4:
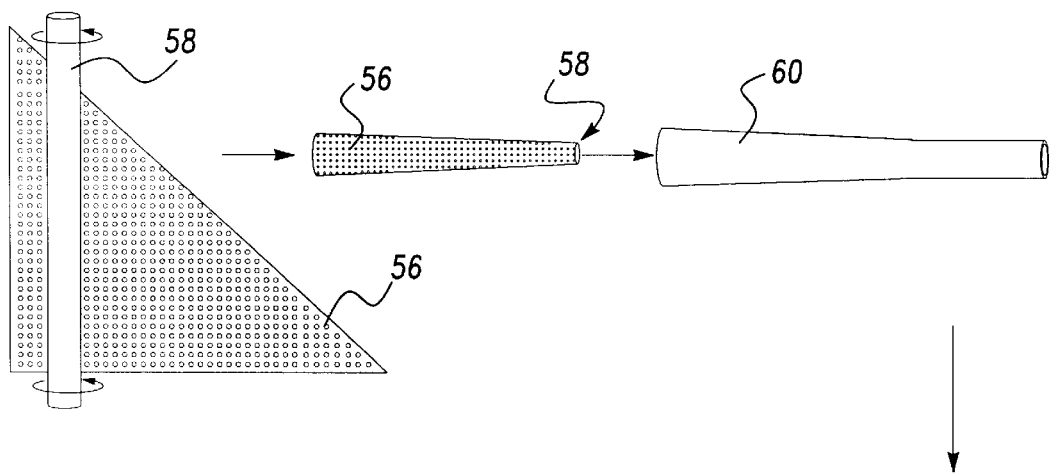
FIG. 4 is a schematic view of a second method of forming the graded pore size structure of the present invention.
Figure 4:
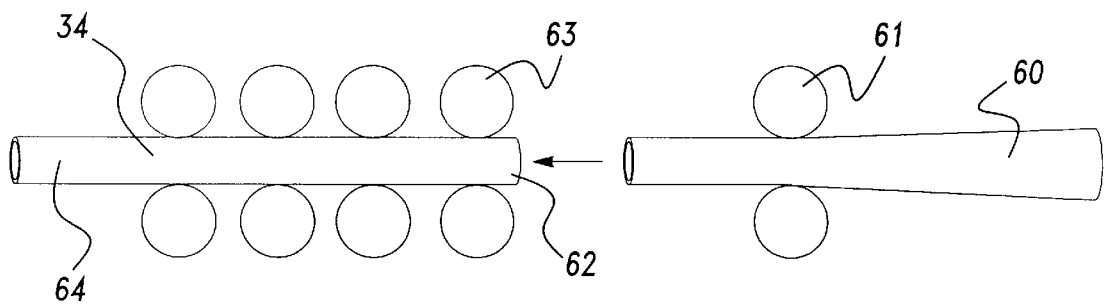

A second method of forming the graded pore size capillary structure in the return channel 34 is depicted in FIG. 4. According to this method, a tapered sheet of felt 56 is initially rolled about a mandrel 58. The felt 56 and mandrel 58 are then inserted into a hollow ductile metal cylinder 60. The metal cylinder 60 is then swagged to a smaller diameter at 61 followed by drawing through a dye 63. During the swagging and drawing process, the cylinder 60 is compressed to a pre-determined, fixed outer diameter. As such, the felt material at one end 62 of the cylinder 60 is compressed to a greater degree than at an opposite end 64. Additionally, the permeability of the felt at the end 62 is decreased along with its average pore diameter. As can be appreciated, the initial taper of the sheet of felt directly corresponds to the resulting pore size gradient and permeability.

It is presently preferred to use stainless steel or refractory metal felt-type material with a fiber size of one to five microns for forming the graded pore size structure in the return channel 34. However, the material is not limited to these metals so long as the material may be well wetted by the alkali metal under operating conditions. Also, a gradient of 3:1 has been found to serve well for avoiding excessive flow restriction for arteries with a 10/1 length to diameter aspect ratio. Shorter or longer structures call for different compressions considering the expected current capability of the cell and the alkali metal flow required therein.

Turning now to FIG. 5, an alternate embodiment of the return channel 34 is shown. In the illustrated embodiment, an open flow tube 68 is disposed along a longitudinal axis of the return channel 34. The open flow tube 68 is in contact with the artery 35 along its entire length via a plurality of apertures 70. As such, alkali metal flowing through the open flow tube 68 travels towards the hot end of the cell 10 until it reaches a location where the capillary forces generated at the local temperature can no longer sustain the locally generated vapor pressure. At this point, the alkali metal migrates into the artery 35 and continues to the evaporator 38. Porous vapor blocks 72 may be installed within the open flow tube 68 to prevent vapor blowout of the open flow tube 68 and causing undesirable "heat piping."

A variation of the open flow tube embodiment of the return channel 34 is illustrated in FIG. 6. In this embodiment, the pore size structure 48 is graded in a radial direction. In this embodiment, larger-sized pores 48b adjacent the open flow tube 68 gradually transition to small-sized pores 48a radially outwardly towards the boundary of the return channel 34.

In this embodiment, the liquid sodium returning from the condenser 32 flows through the open flow tube 68 and in some of the pores 48a and 48b towards higher temperature regions and the evaporator 38 until it becomes too hot for the sodium to remain in the open flow tube 68 characteristic dimension. At this point, the sodium discontinues its flow in the open flow tube 68 and continues flowing in the larger-sized pores 48b and the small sized pores 48a where it can remain as a liquid at higher temperatures. As the sodium continues to flow into higher temperature regions nearer the evaporator 38, it continues to flow in progressively smaller pore sizes progressively nearer the boundary of the return channel 34 where it can exist as a liquid at successively higher temperatures. In this manner, there is liquid sodium continuously in contact with the wall of the return channel 34 all the way along the return channel 34. This facilitates and enhances the heat transfer into the liquid sodium at the wall of the return channel 34 as it travels towards and near the evaporation zone in the evaporator 38, while simultaneously decreasing sodium flow pressure drop in the artery return channel 34.

Figure 7:
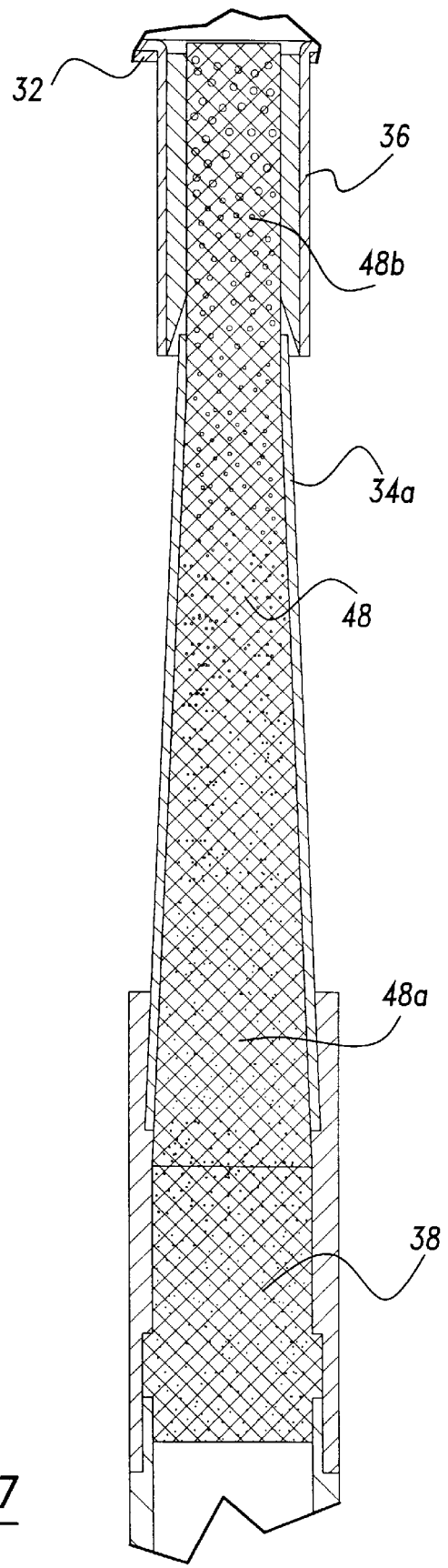
FIG. 7 is a cross-sectional view of a return channel having a non-uniform cross-sectional shape.

Still another embodiment of the present invention is illustrated in FIG. 7. In this embodiment, a return channel 34a having a non-uniformal cross-sectional shape is illustrated. Although other shapes may be utilized, it is presently preferred to design the non-uniform return channel 34a as an elongated cone. According to this embodiment, the pressure drop typically encountered through the use of smaller sized pores is counteracted by the larger diameter flow area which decreases flow resistance. As illustrated, this embodiment employs the graded pore size structure 48 with larger sized pores 48b yielding low capillary pressure in low temperature regions and small-sized pores 48a yielding high capillary pressure in higher temperature regions. However, one skilled in the art will appreciate that the non-uniform cross-sectional shape return channel 34a lends itself to use with a non-graded pore structure within the return channel 34a. One skilled in the art will also appreciate that it is desirable to keep the cross-section of the return channel 34a relatively small to reduce thermal conductance.

Thus, the present invention provides a return channel having a graded pore size capillary structure for providing optimized capillary pressure with minimal flow losses. The large size pores at the cold end of the return channel allow the alkali metal to flow therethrough relatively unrestricted. As the alkali metal moves to hotter regions of the cell along the return channel its vapor pressure increases. The increasing vapor pressure is compensated for by increasing capillary pressure in the return channel generated by the progressively smaller size pores for sustaining alkali metal flow. This enables the alkali metal to flow between the condenser and evaporator without unnecessary restriction over a broad range of changing vapor pressure. As such, the power conversion capability of the AMTEC cell is enhanced particularly at high temperatures.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An alkali metal thermal to electric conversion (AMTEC) cell employing an alkali metal flowing between a hot end of the cell and a cold end of the cell through a solid electrolyte structure which separates the cell into a low-pressure zone and a high-pressure zone, said cell comprising:

a condenser communicating with said low-pressure zone for condensing alkali metal vapor migrating through said low-pressure zone from said solid electrolyte structure; and a return channel coupled to said condenser and an evaporator, said return channel directing said condensed alkali metal from said condenser toward said hot end of the cell and evaporating said condensed alkali metal into said high-pressure zone, said return channel including a graded capillary structure having a characteristic pore size which varies from a relatively larger pore size in a first portion of said graded capillary structure to a relatively smaller pore size in a second portion of said graded capillary structure.

2. The AMTEC cell of claim 1 wherein said graded capillary structure further has a higher permeability in said first portion as compared with the permeability of said second portion.

3. The AMTEC cell of claim 1 wherein the transition from said first portion of said graded capillary structure to said second portion of said graded capillary structure is varied in response to alkali metal vapor pressure.

4. The AMTEC cell of claim 1 wherein said return channel further comprises an open flow tube disposed therein communicating with said graded capillary structure.

5. The AMTEC cell of claim 4 wherein said open flow tube is perforated and generally concentrically disposed within said graded capillary structure.

6. The AMTEC cell of claim 1 wherein said first portion of said graded capillary structure is located adjacent said condenser and said second portion of said graded capillary structure is located adjacent said hot end of said cell.

7. The AMTEC cell of claim 1 wherein said characteristic pore size in said graded capillary structure varies radially within said return channel towards the outer boundary of the return channel.

8. The AMTEC cell of claim 1 wherein said return channel has a non-uniform cross-sectional dimension.

9. The AMTEC cell of claim 1 wherein said return channel has a cross-sectional dimension which increases from said condenser toward said hot end of said cell.

10. An alkali metal thermal electric conversion (AMTEC) cell employing an alkali metal flowing between a hot end of the cell and a cold end of the cell through a solid electrolyte structure which separates the cell into a low-pressure zone and a high-pressure zone, said cell comprising:

a condenser communicating with said low-pressure zone and an evaporator, said condenser condensing alkali metal vapor migrating through said low-pressure zone from said solid electrolyte structure; and a return channel including a capillary structure therein coupled to said condenser for directing said condensed alkali metal into said high-pressure zone, said return channel having a non-uniform cross-sectional dimension for supporting said alkali metal over a range of alkali metal vapor pressure.

11. The AMTEC cell of claim 10 wherein said return channel cross-sectional dimension increases from said condenser towards said hot end of said cell.

* * * * *